United States Patent
Rajan et al.

(10) Patent No.: US 8,453,117 B2
(45) Date of Patent: May 28, 2013

(54) PROVIDING SOFTWARE VALIDATION AS A SERVICE

(75) Inventors: Sreeranga P. Rajan, Sunnyvale, CA (US); Mukul Prasad, San Jose, CA (US); Oksana Tkachuk, Palo Alto, CA (US); Indradeep Ghosh, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 553 days.

(21) Appl. No.: 12/719,971

(22) Filed: Mar. 9, 2010

(65) Prior Publication Data

US 2011/0225568 A1 Sep. 15, 2011

(51) Int. Cl.
*G06F 9/44* (2006.01)
*G06F 3/00* (2006.01)

(52) U.S. Cl.
USPC ............ 717/126; 717/124; 717/127; 719/318

(58) Field of Classification Search
None
See application file for complete search history.

(56) References Cited

U.S. PATENT DOCUMENTS

| | | | |
|---|---|---|---|
| 6,353,896 B1 * | 3/2002 | Holzmann et al. | 714/38.1 |
| 6,959,433 B1 * | 10/2005 | Morales et al. | 717/127 |
| 7,873,908 B1 * | 1/2011 | Varanasi et al. | 715/763 |
| 8,150,674 B2 * | 4/2012 | Anand et al. | 703/22 |
| 8,196,112 B1 * | 6/2012 | Cansizlar | 717/126 |
| 8,271,953 B2 * | 9/2012 | Prasad et al. | 717/126 |
| 2003/0037236 A1 * | 2/2003 | Simon et al. | 713/161 |
| 2006/0117055 A1 * | 6/2006 | Doyle | 707/102 |
| 2008/0104618 A1 * | 5/2008 | Rogers et al. | 719/328 |
| 2008/0141221 A1 * | 6/2008 | Benesovska et al. | 717/124 |
| 2008/0256612 A1 * | 10/2008 | Roy et al. | 726/5 |
| 2008/0307300 A1 * | 12/2008 | Kitayama et al. | 715/234 |
| 2009/0070786 A1 * | 3/2009 | Alves et al. | 719/318 |
| 2009/0089759 A1 * | 4/2009 | Rajan et al. | 717/126 |
| 2009/0235235 A1 * | 9/2009 | Prasad et al. | 717/126 |
| 2010/0131837 A1 * | 5/2010 | Lindal et al. | 715/234 |
| 2010/0293557 A1 * | 11/2010 | Tkachuk et al. | 719/318 |

OTHER PUBLICATIONS

Winterfeldt et al., "Validating User Input, Sturts in Action, Chapter 12", [Online], Nov. 2002, Manning Publication, ISBN 1930110502, pp. 365-408, [Retrived from Internet on Aug. 9, 2012], <http://java.sun.com/developer/Books/javaprogramming/struts/struts_chptr_12.pdf>.*

Sebastian Elbaum et al., "ImprovingWeb Application Testing with User Session Data", [Online], 2003, pp. 1-11, [Retrieved from Internet on Aug. 9, 2012], <http://citeseerx.ist.psu.edu/viewdoc/download?doi=10.1.1.61.6019&rep=repl&type=pdf>.*

(Continued)

*Primary Examiner* — Thuy Dao
*Assistant Examiner* — Ziaul A Chowdhury
(74) *Attorney, Agent, or Firm* — Baker Botts L.L.P.

(57) ABSTRACT

In one embodiment, a method includes accessing an event-driven application input by a user, the event-driven application comprising source code, one or more use cases input by the user for the event-driven application, and one or more functional requirements input by the user for the event-driven application; parsing the use cases and the functional requirements according to the predefined syntax to construct one or more validation modules for validating the event-driven application without any modification to the source code of the event-driven application for validation purposes; formally validating the event-driven application using the validation modules without relying on assertions inserted into the source code of the event-driven application for validation purposes; and if the formal validation finds one or more defects in the event-driven application, generating output for communication to the user identifying the defects.

10 Claims, 7 Drawing Sheets

OTHER PUBLICATIONS

Chien-Hung Liu et al., "Structural Testing of Web Applications", [Online], 2000 IEEE, pp. 84-96, [Retieved from Internet on Aug. 9, 2012], <http://ieeexplore.ieee.org/stamp/stamp.jsp?tp=&arnumber=885863>.*

Giuseppe Antonio Di Lucca, et al., "Testing Web Applications", [Online], 2002 IEEE, pp. 310-319, [Retrieved from Internet on Aug. 9, 2012], <http://ieeexplore.ieee.org/stamp/stamp.jsp?tp=&arnumber=1167787>.*

Marcello Dalpasso et al., "Specification and validation of distributed IP-based designs with JavaCAD", [Online], 1999, pp. 1-5, [Retrieved from Internet on Jan. 26, 2013], <http://www.date-conference.com/proceedings/PAPERS/1999/DATE99/PDFFILES/10C_2.PDF>.*

Volker Turau, "A framework for automatic generation of webbased data entry applications based on XML", [Online], ACM 2002, pp. 1-7, [Retrieved from Internet on Jan. 26, 2013], <http://citeseerx.ist.psu.edu/viewdoc/download?doi=10.1.1.144.6223&rep=rep1&type=pdf>.*

Ye Wu and Jeff Offutt, "Modeling and Testing Web-based Applications", [Online], 2002, pp. 1-12, [Retrieved from Internet on Jan. 26, 2013], <http://www.cs.gmu.edu/~offutt/rsrch/papers/webmodeltr.pdf>.*

W. T. Tsai, "DDSOS: A Dynamic Distributed Service-Oriented Simulation Framework", [Online], Apr. 2006, pp. 1-8, [Retrieved from Internet on Jan. 26, 2013], <http://citeseerx.ist.psu.edu/viewdoc/download?doi=10.1.1.131.4653&rep=rep1&type=pdf>.*

* cited by examiner

Specify a requirement

Select the Driver [ ▽ ] ☐ Symbolic Execution Driver

Select Requirement Template
○ Global safety = Enforces that the event E1 occurs during an execution trace.
○ Eventual response = Requires that if event E1 is seen during a trace, sometime later in the trace event E2 must happen.
○ Immediate response = Requires that if event E1 is seen during a trace, event E2 must be observed after that and before the next state.
○ Precedence = Requires that if event E1 is seen during a trace, sometime earlier in the trace event E2 must have happened.

Select the operator

| + | - | * | / | > | >= | ∨ |
| <= | == | != | & | \| | ~ | ¬ |
| < | len | forall | { | } | → | - |
| → | | | | ( | ) | | |

Pre-loaded requirements

Password mismatch property.
Shopping cart should not be empty while placing the order.
Quantity of each item in the cart should be greater than 0.

Select the Event
Event E1 [ ▽ ] Clear All ← 502
Object List
j_password [ ▽ ]
Execution timepoint
GETITEMS [ ▽ ]
← 501

Event E1
Event E2
Expression
G((cart_length > 0)@GETITEMS);
Requirements

PROVIDING SOFTWARE VALIDATION AS A SERVICE

TECHNICAL FIELD

The present disclosure relates generally to validating software.

BACKGROUND

To validate a software application (such as, for example, a web application or a desktop application), a user may manually write test cases for the application, execute the application under the test cases, and check for violations of properties that should hold true under the test cases. To check for violations, the user may use external monitors that automatically check whether the properties are true at predetermined times during execution of the application or use inline assertions added to the source code of the application that return results at predetermined times during execution of the application indicating whether the properties are true. Such validation is substantially ad hoc, manual, and resource intensive and provides relatively limited coverage of potential bugs, especially corner-case bugs.

DESCRIPTION OF EXAMPLE EMBODIMENTS

Particular embodiments provide software validation as a service (VaaS). In particular embodiments, a user may select a software application to be formally validated and specify one or more use cases and one or more functional requirements in connection with the software application to be validated. In particular embodiments, the software application to be validated may be a web-based application or a desktop application. In particular embodiments, the software application to be validated may be an event-driven application where the flow of the programming logic is determined by events. There may be various types of events that may drive an event-driven application, such as, for example and without limitation, user actions or inputs to the application, messages received from other applications or threads, or outputs from sensors.

In particular embodiments, each use case may specify a particular event that may cause the event-driven application to proceed from a first stage to a second stage following some programming logic. In particular embodiments, each functional requirement may describe a requirement in connection with a particular use case that the event-driven application needs to satisfy when that particular use case occurs. That is, each functional requirement may describe the correct (i.e., valid) behavior of the event-driven application in response to the occurrence of a particular event. In particular embodiments, each use case may be associated with one or more functional requirements. That is, sometimes, the event-driven application may need to satisfy multiple requirements when a particular use case occurs. In particular embodiments, the use cases and the functional requirements may be specified using certain predefined syntax. In particular embodiments, the use cases and the functional requirements may be specified using the same predefined syntax. Alternatively, in particular embodiments, the use cases may be specified using a first predefined syntax, and the functional requirements may be specified using a second predefined syntax. Particular embodiments may provide a user interface that enables users to select the software applications to be validated and specify the use cases and the functional requirements in connection with the software applications to be validated.

For a particular software application, particular embodiments may parse the use cases and the functional requirements specified in connection with the software application according to the predefined syntax to construct one or more validation modules for validating the software application without any modification to the source code of the software application. More specifically, in particular embodiments, the validation modules may be constructed without any assertion inserted into the source code of the software application for the purpose of validating the software application. Particular embodiments may then formally validate the software application using the validation modules and without replying on any assertion inserted into the source code of the software application for the purpose of validating the software application. If any defect is detected in the software application during the validation process, particular embodiments may report the defects to the user.

Particular embodiments validate an event-driven application without making any modification to the source code of the event-driven application, such as, for example and without limitation, inserting any assertion to the source code of the event-driven application for validation purposes. The validation modules used for validating the event-driven application are constructed using only the event-driven application, the use cases, and the functional requirements. The validation of the event-driven application is performed using only the event-driven application and the validation modules.

Figure 1:
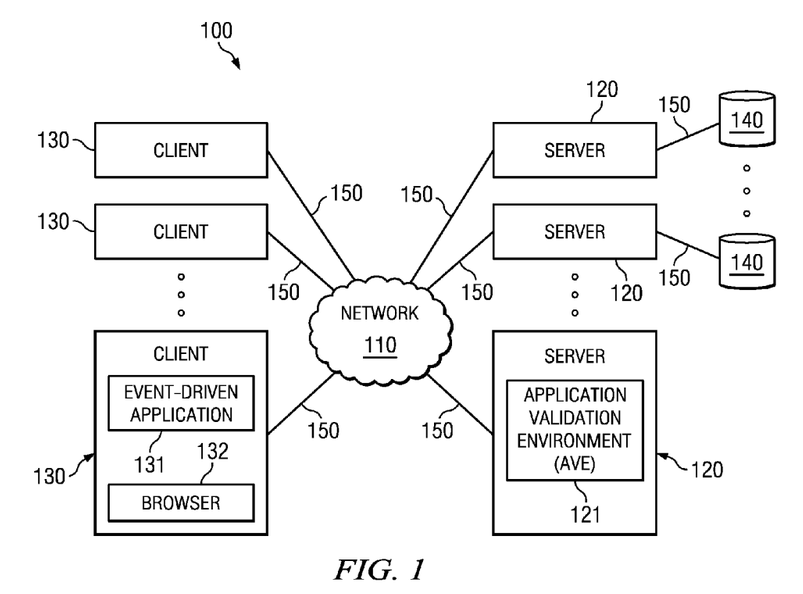
FIG. 1 illustrates an example network environment for providing software validation as a service.

FIG. 1 illustrates an example network environment 100 suitable for providing software validation as a service. Network environment 100 includes a network 110 coupling one or more servers 120 and one or more clients 130 to each other. In particular embodiments, network 110 is an intranet, an extranet, a virtual private network (VPN), a local area network (LAN), a wireless LAN (WLAN), a wide area network (WAN), a metropolitan area network (MAN), a portion of the Internet, or another network 110 or a combination of two or more such networks 110. The present disclosure contemplates any suitable network 110.

One or more links 150 couple a server 120 or a client 130 to network 110. In particular embodiments, one or more links 150 each includes one or more wireline, wireless, or optical links 150. In particular embodiments, one or more links 150 each includes an intranet, an extranet, a VPN, a LAN, a WLAN, a WAN, a MAN, a portion of the Internet, or another link 150 or a combination of two or more such links 150. The present disclosure contemplates any suitable links 150 coupling servers 120 and clients 130 to network 110.

In particular embodiments, each server 120 may be a unitary server or may be a distributed server spanning multiple computers or multiple datacenters. Servers 120 may be of various types, such as, for example and without limitation, web server, news server, mail server, message server, advertising server, file server, application server, exchange server, database server, or proxy server. In particular embodiments, each server 120 may include hardware, software, or embedded logic components or a combination of two or more such components for carrying out the appropriate functionalities implemented or supported by server 120. For example, a web server is generally capable of hosting websites containing web pages or particular elements of web pages. More specifically, a web server may host HTML files or other file types, or may dynamically create or constitute files upon a request, and communicate them to clients 130 in response to HTTP or other requests from clients 130. A mail server is generally capable of providing electronic mail services to various clients 130. A database server is generally capable of providing an interface for managing data stored in one or more data stores.

In particular embodiments, a software application validation environment (AVE) 121 may be implemented on a server 120. In particular embodiments, AVE 121 may include hardware, software, or embedded logic components or a combination of two or more such components for carrying out the appropriate functionalities implemented or supported by AVE 121. In particular embodiments, a software validation service, as described in more detail in connection with FIGS. 2 and 3, may be provided within AVE 121.

In particular embodiments, one or more data storages 140 may be communicatively linked to one or more severs 120 via one or more links 150. In particular embodiments, data storages 140 may be used to store various types of information. In particular embodiments, the information stored in data storages 140 may be organized according to specific data structures. In particular embodiment, each data storage 140 may be a relational database. Particular embodiments may provide interfaces that enable servers 120 or clients 130 to manage, e.g., retrieve, modify, add, or delete, the information stored in data storage 140.

In particular embodiments, each client 130 may be an electronic device including hardware, software, or embedded logic components or a combination of two or more such components and capable of carrying out the appropriate functionalities implemented or supported by client 130. For example and without limitation, a client 130 may be a desktop computer system, a notebook computer system, a netbook computer system, a handheld electronic device, or a mobile telephone. The present disclosure contemplates any suitable clients 130. A client 130 may enable a network user at client 130 to access network 130. A client 130 may enable its user to communicate with other users at other clients 130.

A client 130 may have a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 130 may enter a Uniform Resource Locator (URL) or other address directing the web browser 132 to a server 120, and the web browser 132 may generate a Hyper Text Transfer Protocol (HTTP) request and communicate the HTTP request to server 120. Server 120 may accept the HTTP request and communicate to client 130 one or more Hyper Text Markup Language (HTML) files responsive to the HTTP request. Client 130 may render a web page based on the HTML files from server 120 for presentation to the user. The present disclosure contemplates any suitable web page files. As an example and not by way of limitation, web pages may render from HTML files, Extensible HyperText Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In particular embodiments, a client 130 enables a user at client 130 to access services, such as software validation services, provided by servers 120. In particular embodiments, an event-driven application 131 may reside on a client 130. A user at client 130 may submit event-driven application 131 to AVE 121 along with one or more use cases and functional requirements so that event-driven application 131 may be formally validated. In particular embodiments, AVE 121 may provide a user interface that enables the user at client 130 to submit event-driven application 131 and the use cases and functional requirements for validation. In particular embodiments, the user interface may be web-based user interface provided through web browser 132. The user at client 130 may interact with AVE 121 via the web-base user interface to use the software validation service provided within AVE 121.

Figure 2:
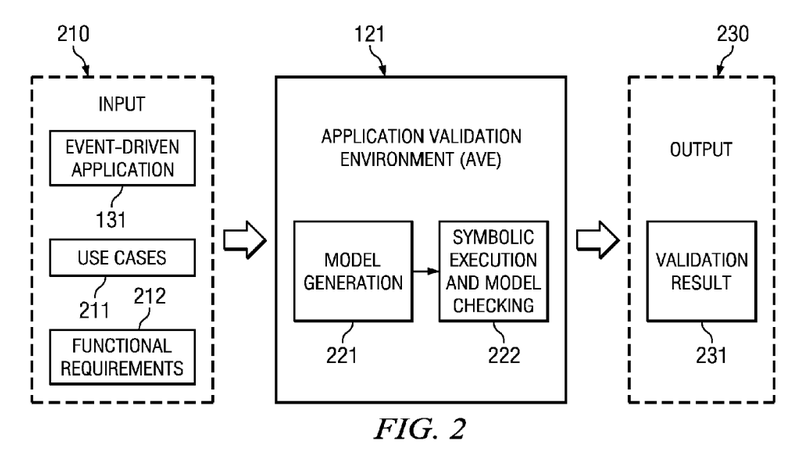
FIG. 2 illustrates an example system for providing software validation as a service.
Figure 3:
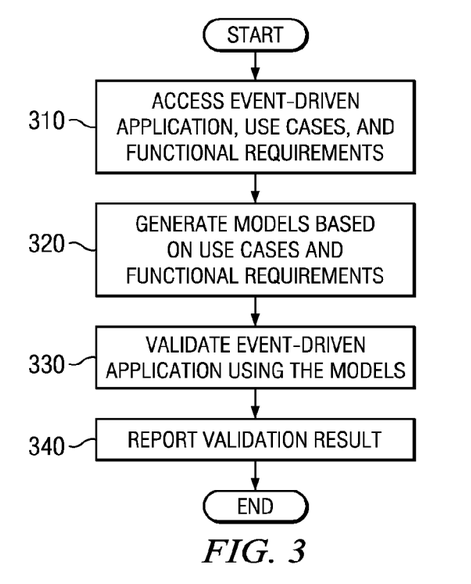
FIG. 3 illustrates an example method for providing software validation as a service.
Figure 4:
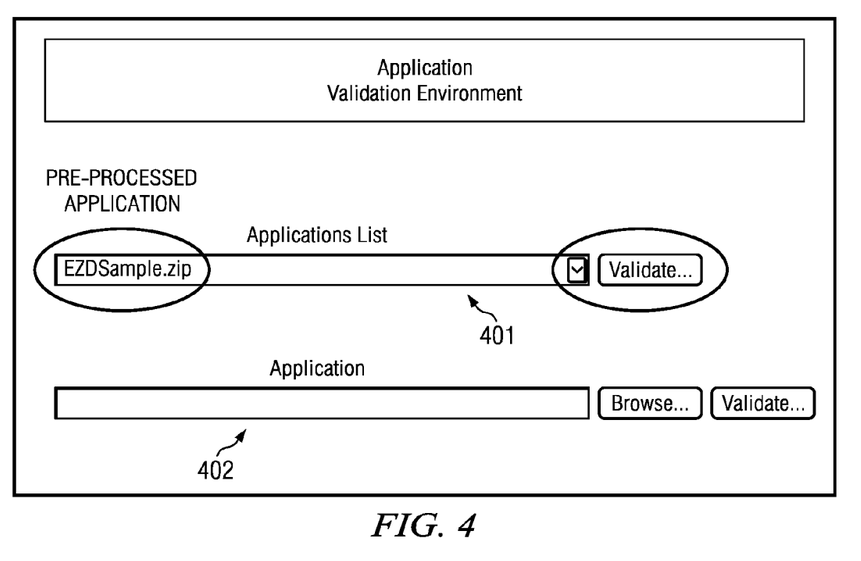
FIGS. 4-7 illustrate an example interface that enables a user to specify use cases and functional requirements used to validate software applications.

FIG. 2 illustrates an example system for providing software validation as a service. FIG. 3 illustrates an example method for providing software validation as a service. FIGS. 2 and 3 are described in connection with each other. In particular embodiments, a software validation service may be provided within a software application validation environment (AVE), such as AVE 121 illustrated in FIG. 1. In particular embodiments, AVE 121 receives as input 210 a software application to be validated, such as event-driven application 131 illustrated in FIG. 1, and one or more use cases 211 and one or more functional requirements 212 specified in connection with event-driven application 131 by a user using the software validation service. In particular embodiments, AVE 121 transmits as output 230 a result 231 of the validation process performed on event-driven application 131 based on use cases 211 and functional requirements 212. Event-driven application 131 may be a web-based software application or a desktop software application. In particular embodiments, the user may select and specify to AVE 121 the event-driven application to be validated.

In particular embodiments, each use case 211 describes an event that drives event-driven application 131 to proceed from one stage to another stage following some programming logic of event-driven application 131. In particular embodiments, each functional requirement 212 is connected with a particular use case 211 and describes a behavioral or programming requirement that event-driven application 131 needs to satisfy when that particular use case 211 occurs in order to be considered valid. Each use case 211 may be associated with one or more functional requirements 212. If a particular use case 211 is associated with multiple functional requirements 212, then, in particular embodiments, when that particular use 211 occurs, event-driven application 131 needs to satisfy each and every one of the associated functional requirements 212 in order to be considered valid.

For example, suppose event-driven application 131 is a web-based electronic mail (email) application that allows a user to access his email account at a web-based email service (e.g., YAHOO MAIL or GMAIL) via a web browser. To sign into his web-based email account, the user typically is required to provide a login identifier (ID) and a password. In this case, a use case may be that the user enters his login ID and password and clicks a sign-in or submit button via the web-based email application. This may also be referred to as an event. Upon the occurrence of this particular event (i.e., the user entering his login ID and password and clicking the sign-in button), the web-based email application typically transmits the login ID and password to a remote email server to validate the user's login ID and password against the user information stored in association with the web-based email service. If the user has provided the correction combination of login ID and password, the web-based email application allows the user access to his email account. On the other hand, if the user has provided the wrong combination of login ID and password, the web-based email application denies the user access to any email account and may provide an error message notifying the user of his mistake. In this case, the functional requirements associated with the sign-in use case may include: (1) validating the login ID and password; (2) allowing the user access to his email account if the combination of login ID and password is correct; and (3) denying the user access to any email account if the combination of login ID and password is in correct. For the web-based email application to be valid, upon occurrence of the sing-in use case, all three functional requirements need to be satisfied independently.

In particular embodiments, use cases 211 and functional requirements 212 may be specified using a predefined syntax. The concept is similar to that of a computer programming language having a predefined syntax. An example syntax for specifying an event may be "event:=Boolean type timed-expression", where "timed-expression" may be an arithmetical-logical expression over fields or objects in the event-driven application, and each field or object may be annotated with a time-point relative to the execution of the event-driven application, which specifies the time-point at which the value of the field or object should be sampled in order to evaluate the timed expression (e.g., $((a+b)@m1==c@m2) \& ((d<2)@m3)$, where a, b, c, d denote fields in the event-driven application and m1, m2, m3 specify time-points during the execution of the event-driven application). In particular embodiments, use cases 211 and functional requirements 212 may be specified using the same predefined syntax. Alternatively, in particular embodiments, use cases 211 and functional requirements 212 may be specified using two different predefined syntax. The predefined syntax enables AVE 121 to parse use cases 211 and functional requirements 212 received from the user.

In particular embodiments, AVE 121 may include requirements validation middleware that capture global requirements and validation for event-driven application 131. In particular embodiments, a template-based formalism is employed to capture the requirements or properties. A small set of relevant temporal patterns may be provided from which to choose in capturing the global requirements or properties. In particular embodiments, a set of light-weight, pre-coded, automatically-configurable checkers are employed to capture the global requirements or properties. A Java-like syntax may be used to specify expressions. A library of atomic entities or events is automatically generated. Such embodiments may be used with both formal and semi-formal techniques. Particular embodiments use a requirements entry interface that includes a requirements language and a library of requirement templates. In particular embodiments, the requirements validation middleware may be coupled to a software validation tool and a library of templatized property monitors.

In particular embodiments, AVE 121 may include a model generation component 221 and a symbolic execution and model checking component 222. In particular embodiments, to formally validate event-driven application 131 selected by the user based on use cases 211 and functional requirements 222 specified in connection with event-driven application 131 by the user, model generation component 221 may access event-driven application 131, use cases 211, and functional requirements 212, as illustrated in step 310 of FIG. 3, and parse use cases 211 and functional requirements 212 according to the predefined syntax with which use cases 211 and functional requirements 212 are specified to construct one or more validation modules, as illustrated in step 320 of FIG. 3. The predefined syntax enables model generation component 221 to essentially understand use cases 211 and functional requirements 212 similar to that of a parser of a compiler being able to understand source code written using the predefined syntax of a programming language.

In particular embodiments, the validation modules may include various test input to event-driven application 131 determined based on use cases 211, and valid output against which the actual output from event-driven application 131 is compared to determine whether event-driven application 131 behaves correctly according to functional requirements 212. With the above example of the web-based email application and the sign-in use case, the test input may include a correct combination of login ID and password and one or more incorrect combinations of login ID and password. The valid output for the correct combination of login ID and password may be access to the user's email account. The valid output for each incorrect combination of login ID and password may be an error message without access to any email account. When the web-based email application receives the correct combination of login ID and password, if the web-based email application allows the user access to his email account, then the web-based email application satisfies one of the functional requirements associated with the sign-in use case; on the other hand, if the web-based email application denies the user access to his email account, then the web-based email application does not satisfy one of the functional requirements associated with the sign-in use case, and therefore has a defect. Conversely, when the web-based email application receives an incorrect combination of login ID and password, if the web-based email application denies the user access to any email account and displays an error message, then the web-based email application satisfies one of the functional requirements associated with the sign-in use case; on the other hand, if the web-based email application allows the user access to any email account, then the web-based email application does not satisfy one of the functional requirements associated with the sign-in use case, and therefore has a defect.

In particular embodiments, the validation modules may then be forwarded to symbolic execution and modeling checking component 222 together with event-driven application 131. In particular embodiments, symbolic execution and modeling checking component 222 may formally validate event-driven application 131 using the validation modules, as illustrated in step 330 of FIG. 3. In particular embodiments, validation result 231 of the validation performed on event-driven application 131 may then be reported to the user, as illustrated in step 340 of FIG. 3.

In order for an AVE to parse the use cases and the functional requirements specified for an event-driven application, the use cases and the functional requirements need to be specified in certain predefined syntax. However, it may be inconvenient to the users using the software validation service having to learn one or more new syntax for the purpose of specifying the use cases and the functional requirements. Thus, particular embodiments may provide a user interface that helps a user select the event-driven application to be validated and specify the use cases and the functional requirements in connection with the selected event-driven application. In particular embodiments, the user interface may be web-based and may be accessed by a user through a web browser. For example, when the user wishes to use the software validation service, the user may enter a URL associated with the AVE in his web browser, which causes the initial web page of the user interface to be displayed in his web browser. The user may then interact with the AVE from that web page (e.g., entering information to be transmitted to the AVE). In particular embodiments, the user interface may include one or more windows, screens, or web pages.

In particular embodiments, the user interface enables a user to specify the use cases and the functional requirements associated with the individual use cases using a human-readable or an intuitive language so that the user does not have to spend much effort learning to use the user interface or the predefined syntax used for specifying the use cases and the functional requirements. The user interface may provide predefined components that the user may select in order to specify a use case and its associated functional requirements. Particular embodiments may convert the use cases and the functional requirements specified by the user via the user interface into use cases and functional requirements formally specified using the predefined syntax.

Figure 5:
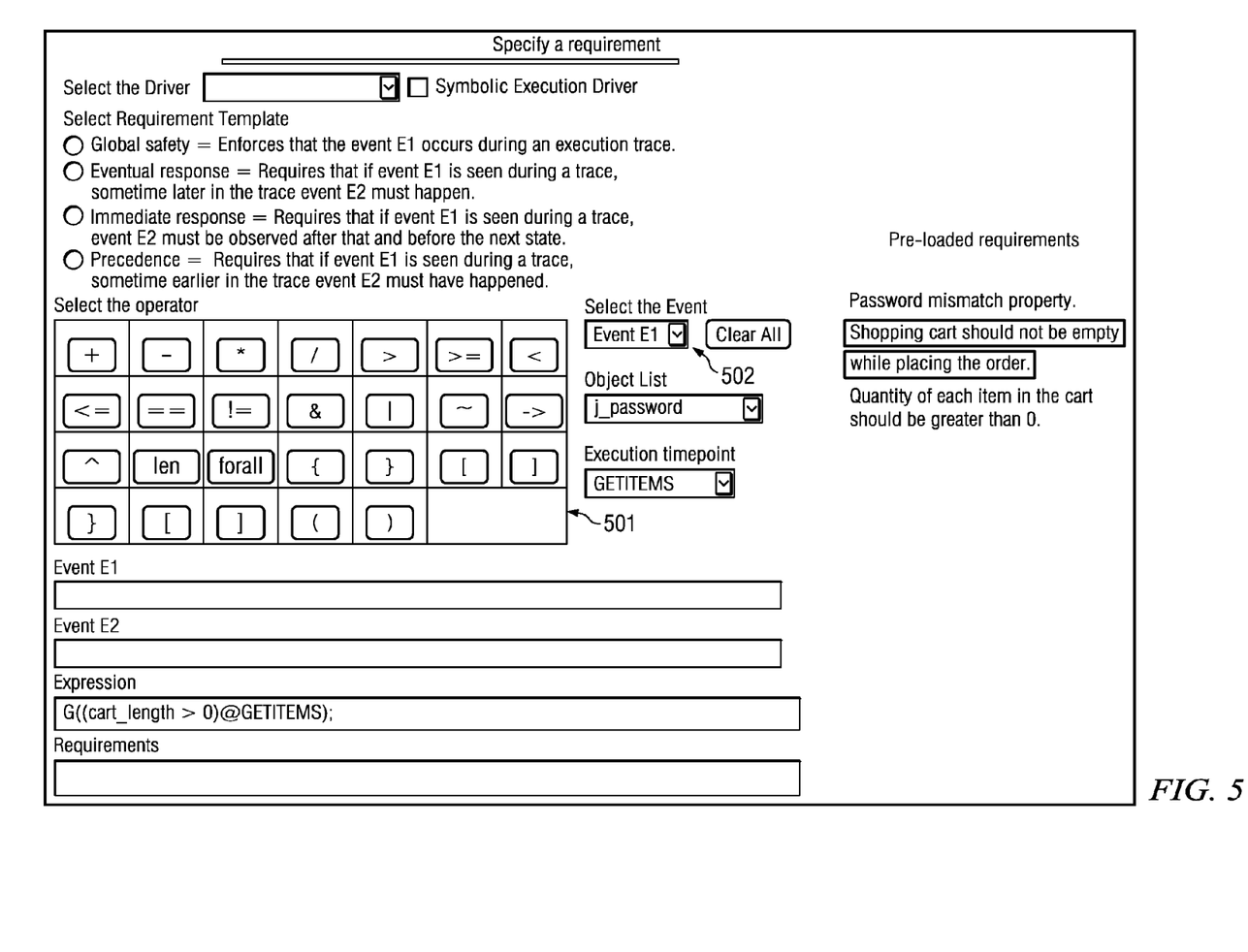
Figure 6:
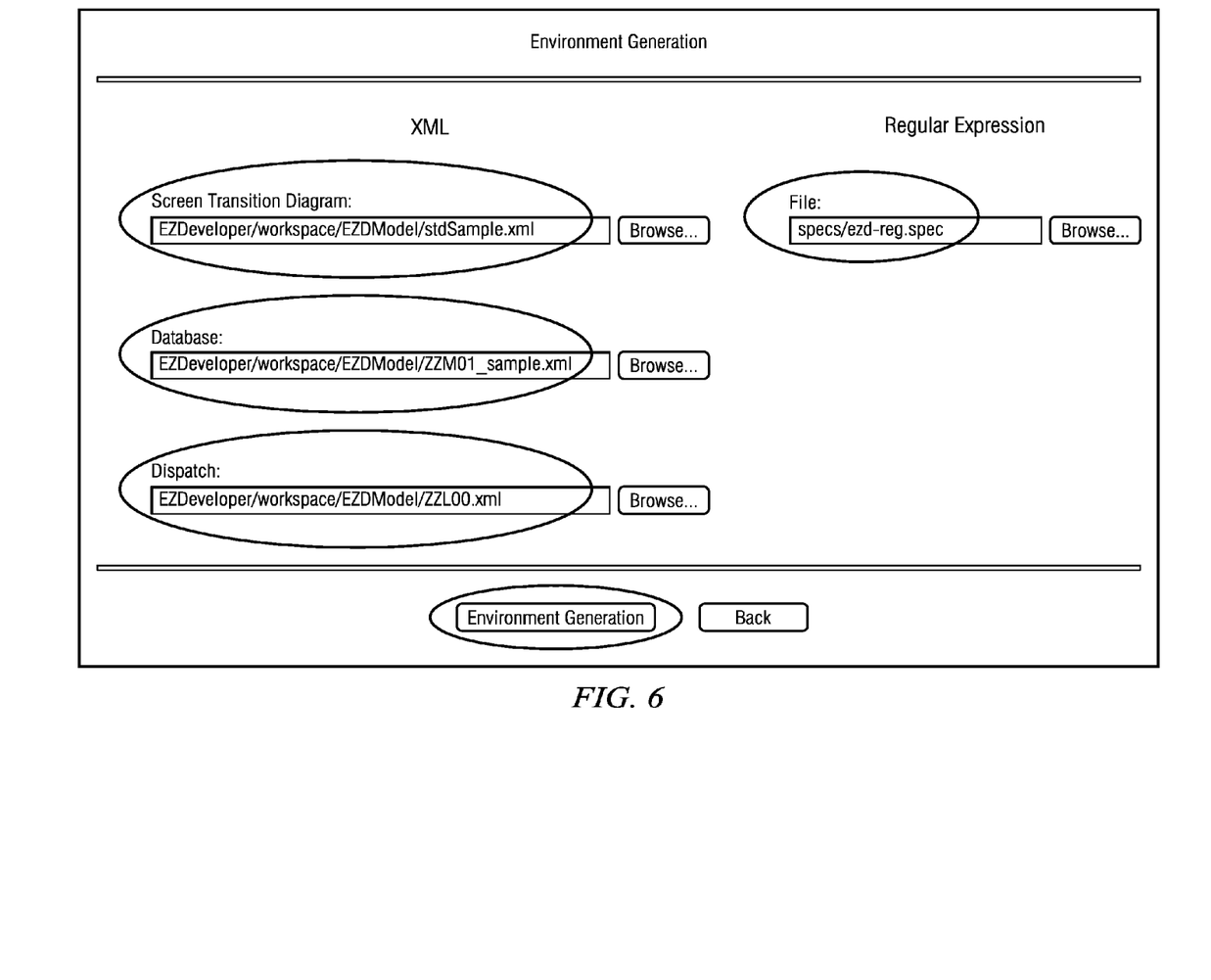
Figure 7:
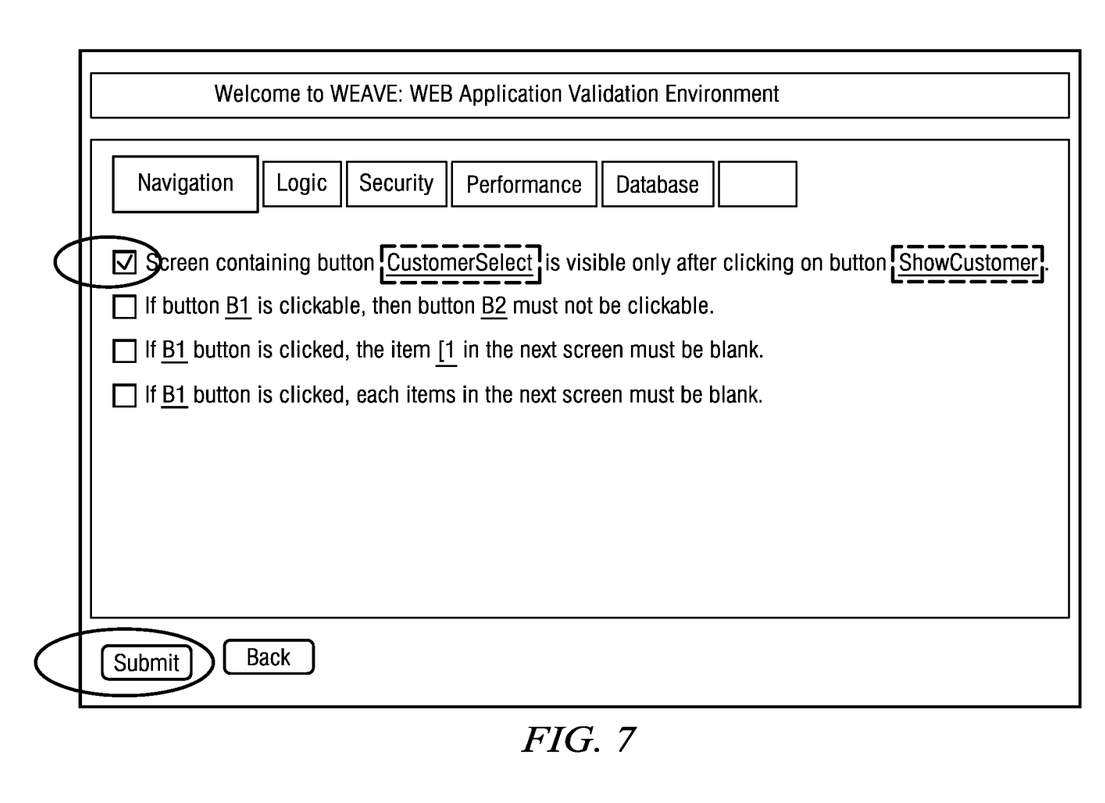

FIGS. 4-7 illustrates an example interface that enables a user to specify use cases and functional requirements used to validate software applications. Note that the interface components illustrated in FIGS. 4-7 are for illustration only. Different embodiments may include different interface components in the user interface. For example, in FIG. 4, a user may select multiple event-driven applications to be validated via component 401 or a single event-driven application to be validated via component 402. In FIG. 5, a list of predefined operators is provided with component 501 in the form of clickable buttons, and the user may select (i.e., click on) any of these operators in connection with specifying a use case and its associated functional requirements. A list of predefined events is provided with component 502 in the form of a pull-down menu, and the user may choose any of these events to use as a use case in connection with a selected event-driven application. FIGS. 6 and 7 illustrates additional example interface components that may be included in the user interface that further help the user interact with the AVE and use the software validation service. The user may compose one event at a time by, for example, select a predefined functional requirement template, an event, fields or objects and time-points in the event-driven application used in the event, and combine the objects, time-points, and operators.

Figure 8:
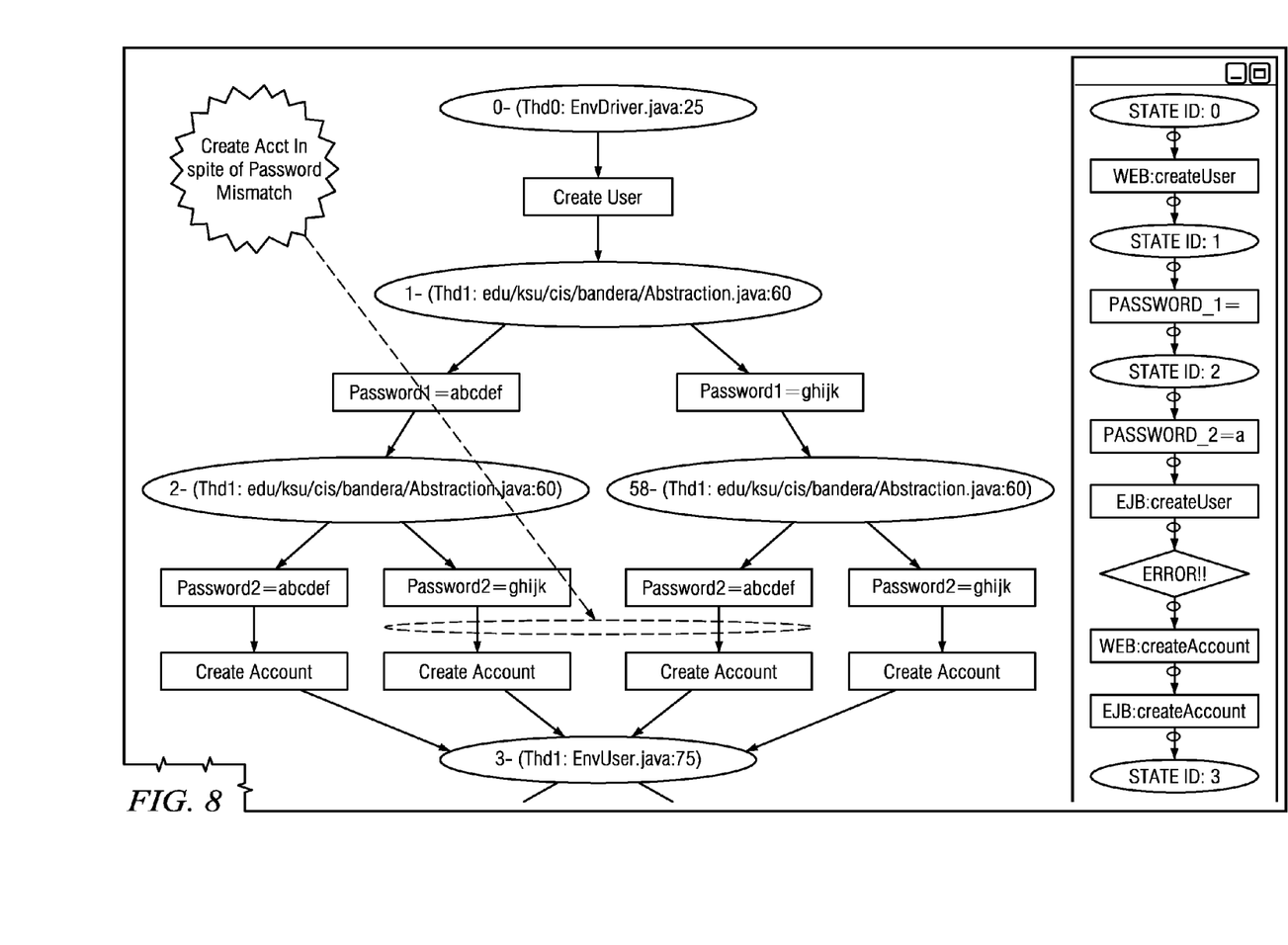
FIG. 8 illustrates an example visualization of defects detected during software validation.

In particular embodiments, when reporting the validation result of an event-driven application to the user requesting the validation, defects detected in the event-driven application, if any, may be represented using graphical visualization so that it is convenient for the user to review the defects. FIG. 8 illustrates an example visualization of defects detected during validation of an event-driven application. Again, the graphical components included in the graphical visualization are for illustration only. Different embodiments may utilize different graphical components to represent the specific defects detected during a validation process. For example, for each defect detected, the result may include the use case and the functional requirement associated with the defect, the specific input or event that causes the event-driven application to fail, the reason the event-driven application fails to satisfy the associated functional requirement, or any relationship the defect has with other defects.

Figure 9:
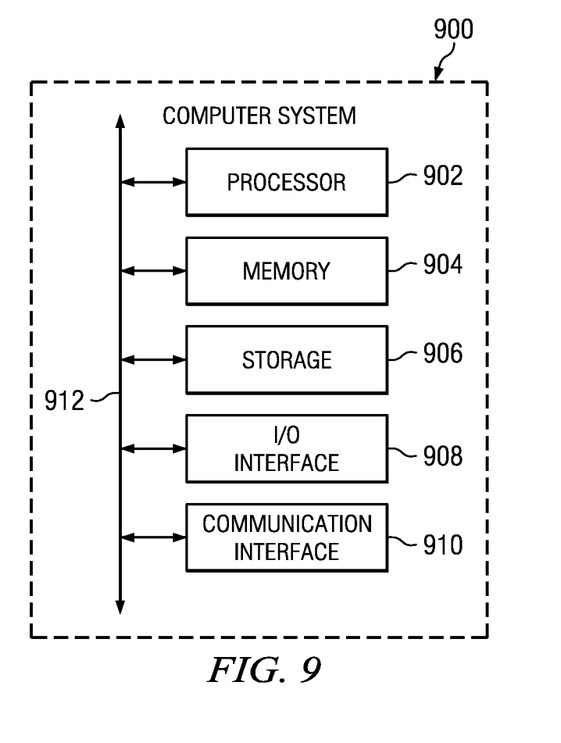
FIG. 9 illustrates an example architecture for an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. The present disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. The present disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 95 U.S.C. §101. Herein, reference to a computer-readable storage medium excludes transitory forms of signal transmission (such as a propagating electrical or electromagnetic signal per se) to the extent that they are not eligible for patent protection under 95 U.S.C. §101.

This disclosure contemplates one or more computer-readable storage media implementing any suitable storage. In particular embodiments, a computer-readable storage medium implements one or more portions of processor 902 (such as, for example, one or more internal registers or caches), one or more portions of memory 904, one or more portions of storage 906, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

We claim:

1. A method comprising, by one or more computer systems:
    accessing:
        an event-driven application input by a user, the event-driven application comprising source code;
        one or more use cases input by the user for the event-driven application, the use cases being formally specified using a predefined syntax and referring to one or more events that drives the event-driven application; and
        one or more functional requirements input by the user for the event-driven application, the functional requirements being formally specified using the predefined syntax and each referring to a requirement that the event-driven application needs to satisfy when a particular one of the use cases occurs;
    parsing the use cases and the functional requirements according to the predefined syntax to construct one or more validation modules for validating the event-driven application without any modification to the source code of the event-driven application for validation purposes;
    formally validating the event-driven application using the validation modules without relying on assertions inserted into the source code of the event-driven application for validation purposes; and
    if the formal validation finds one or more defects in the event-driven application, generating output for communication to the user identifying the defects.

2. The method of claim 1, further comprising:
    providing a web-based user interface that enables a user to specify the use cases and the functional requirements without using the predefined syntax; and
    converting the use cases and the functional requirements specified by the user via the web-based user interface to comply with the predefined syntax.

3. The method of claim 1, wherein the output comprises a graphical visualization of the defects in the event-driven application found during the formal validation.

4. A system comprising:
    a memory comprising instructions executable by one or more processors; and
    one or more processors coupled to the memory and operable to execute the instructions, the one or more processors being operable when executing the instructions to:
        access:
            an event-driven application input by a user, the event-driven application comprising source code;
            one or more use cases input by the user for the event-driven application, the use cases being formally specified using a predefined syntax and referring to one or more events that drives the event-driven application; and
            one or more functional requirements input by the user for the event-driven application, the functional requirements being formally specified using the predefined syntax and each referring to a requirement that the event-driven application needs to satisfy when a particular one of the use cases occurs;
        parse the use cases and the functional requirements according to the predefined syntax to construct one or more validation modules for validating the event-driven application without any modification to the source code of the event-driven application for validation purposes;

formally validate the event-driven application using the validation modules without relying on assertions inserted into the source code of the event-driven application for validation purposes; and if the formal validation finds one or more defects in the event-driven application, generate output for communication to the user identifying the defects.

5. The system of claim 4, wherein the one or more processors are further operable when executing the instructions to:

provide a web-based user interface that enables a user to specify the use cases and the functional requirements without using the predefined syntax; and convert the use cases and the functional requirements specified by the user via the web-based user interface to comply with the predefined syntax.

6. The system of claim 4, wherein the output comprises a graphical visualization of the defects in the event-driven application found during the formal validation.

7. One or more computer-readable non-transitory storage media embodying software operable when executed by one or more computer systems to:

access:

an event-driven application input by a user, the event-driven application comprising source code;

one or more use cases input by the user for the event-driven application, the use cases being formally specified using a predefined syntax and referring to one or more events that drives the event-driven application; and one or more functional requirements input by the user for the event-driven application, the functional requirements being formally specified using the predefined syntax and each referring to a requirement that the event-driven application needs to satisfy when a particular one of the use cases occurs;

parse the use cases and the functional requirements according to the predefined syntax to construct one or more validation modules for validating the event-driven application without any modification to the source code of the event-driven application for validation purposes;

formally validate the event-driven application using the validation modules without relying on assertions inserted into the source code of the event-driven application for validation purposes; and if the formal validation finds one or more defects in the event-driven application, generate output for communication to the user identifying the defects.

8. The media of claim 7, wherein the software is further operable when executed by one or more computer systems to:

provide a web-based user interface that enables a user to specify the use cases and the functional requirements without using the predefined syntax; and convert the use cases and the functional requirements specified by the user via the web-based user interface to comply with the predefined syntax.

9. The media of claim 7, wherein the output comprises a graphical visualization of the defects in the event-driven application found during the formal validation.

10. A system having a memory coupling to a computer processor and further comprising:

means for accessing:

an event-driven application input by a user, the event-driven application comprising source code;

one or more use cases input by the user for the event-driven application, the use cases being formally specified using a predefined syntax and referring to one or more events that drives the event-driven application; and one or more functional requirements input by the user for the event-driven application, the functional requirements being formally specified using the predefined syntax and each referring to a requirement that the event-driven application needs to satisfy when a particular one of the use cases occurs;

means for parsing the use cases and the functional requirements according to the predefined syntax to construct one or more validation modules for validating the event-driven application without any modification to the source code of the event-driven application for validation purposes;

means for formally validating the event-driven application using the validation modules without relying on assertions inserted into the source code of the event-driven application for validation purposes; and means for, if the formal validation finds one or more defects in the event-driven application, generating output for communication to the user identifying the defects.

* * * * *